(12) United States Patent
Kwon et al.

(10) Patent No.: US 6,574,410 B2
(45) Date of Patent: Jun. 3, 2003

(54) PLANAR LIGHT WAVEGUIDE CIRCUIT WITH LANDMARKS

(75) Inventors: Oh-Dal Kwon, Suwon (KR); Sung-Hyun Lee, Seoul (KR); Jung-Hwan Cho, Songnam (KR); Jin-Kyung Choi, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 62 days.

(21) Appl. No.: 09/967,006

(22) Filed: Sep. 28, 2001

(65) Prior Publication Data

US 2002/0118940 A1 Aug. 29, 2002

(30) Foreign Application Priority Data

Dec. 30, 2000 (KR) .......................... 2000-87199

(51) Int. Cl.[7] ................................. G02B 6/10
(52) U.S. Cl. ................. 385/129; 385/438; 385/33
(58) Field of Search .................. 385/152, 129–131, 385/14; 438/33

(56) References Cited

U.S. PATENT DOCUMENTS 5,853,626 A * 12/1998 Kato .......................... 264/1.25
6,046,101 A *  4/2000 Dass et al. .................. 438/624

* cited by examiner

*Primary Examiner*—Robert H. Kim
*Assistant Examiner*—Richard Kim
(74) *Attorney, Agent, or Firm*—Cha & Reiter (57) ABSTRACT

A planar light waveguide circuit includes a plurality of landmarks arranged on the planar light waveguide circuit at intervals of a specific gap starting from a cut section of the planar light waveguide circuit so as to increase the uniformity of a coupling loss that occurs when connecting the planar light waveguide circuit in alignment with optical fiber blocks, wherein the landmarks are formed onto the planar light waveguide circuit so as to enable an operator to monitor a permissible angle error, and wherein Arabic numerals or specific symbols are marked in association with the landmarks to help the operator distinguish the landmarks.

11 Claims, 8 Drawing Sheets

PLANAR LIGHT WAVEGUIDE CIRCUIT WITH LANDMARKS

CLAIM OF PRIORITY

This application makes reference to, incorporates the same herein, and claims all benefits accruing under 35 U.S.C. Section 119 from an application for "Planar Light Waveguide Circuit with Landmarks," filed in the Korean Industrial Property Office on Dec. 30, 2000 and there duly assigned Serial No. 2000-87199.

BACKGROUND OF THE INVENTION

1. Field of the Invention

The present invention relates generally to a planar light waveguide circuit, and in particular, to a planar light waveguide circuit with landmarks and a method of manufacturing the same.

2. Description of the Related Art

Recently, active researches have been conducted on an optical element integration technology of manufacturing a light waveguide on a planar substrate for the purpose of optical signal processing, such as dividing, modulating, switching, and multiplexing of optical signals. To manufacture this type of light waveguide circuit, various techniques including designing, manufacturing, and packaging, are required.

A general light waveguide component is equivalent to a light transmission line for propagating optical waves with a small loss by confining the optical waves within the waveguide component in a longitudinal direction. To achieve this, the light waveguide could be formed in a substrate with a high refractive index and a cladding with a low refractive index, where the cladding is surrounded by the core.

Figure 1:
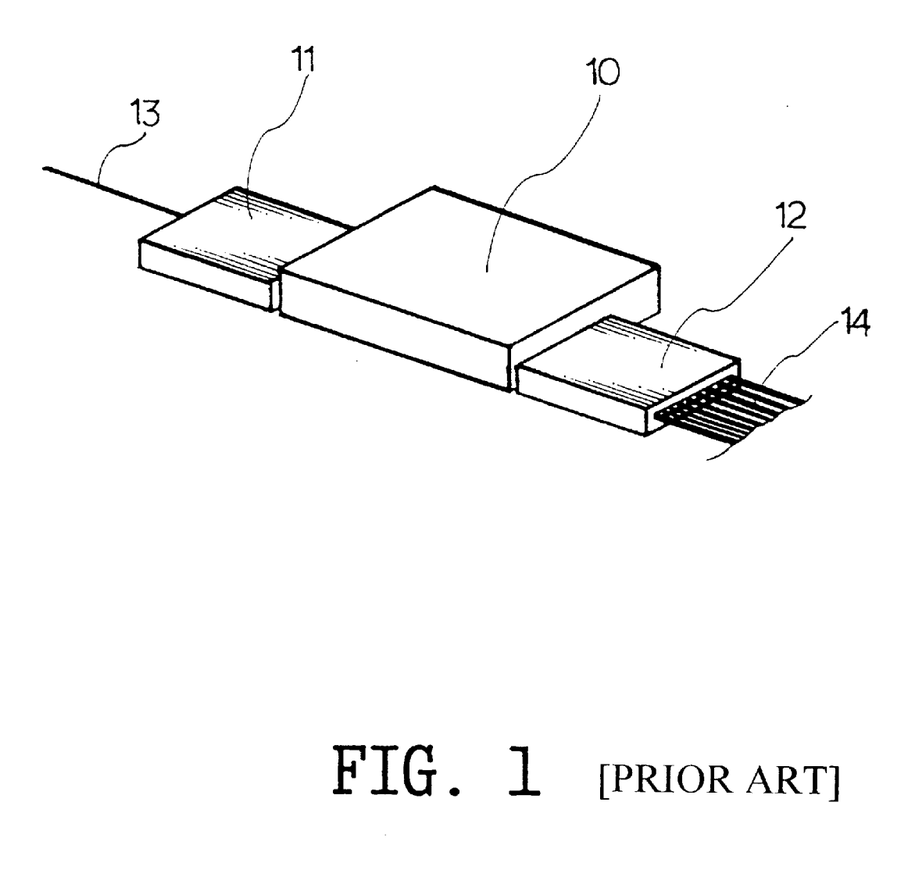
FIG. 1 is a perspective view illustrating a state where a planar light waveguide circuit is aligned with optical fiber blocks according to the prior art.
Figure 2:
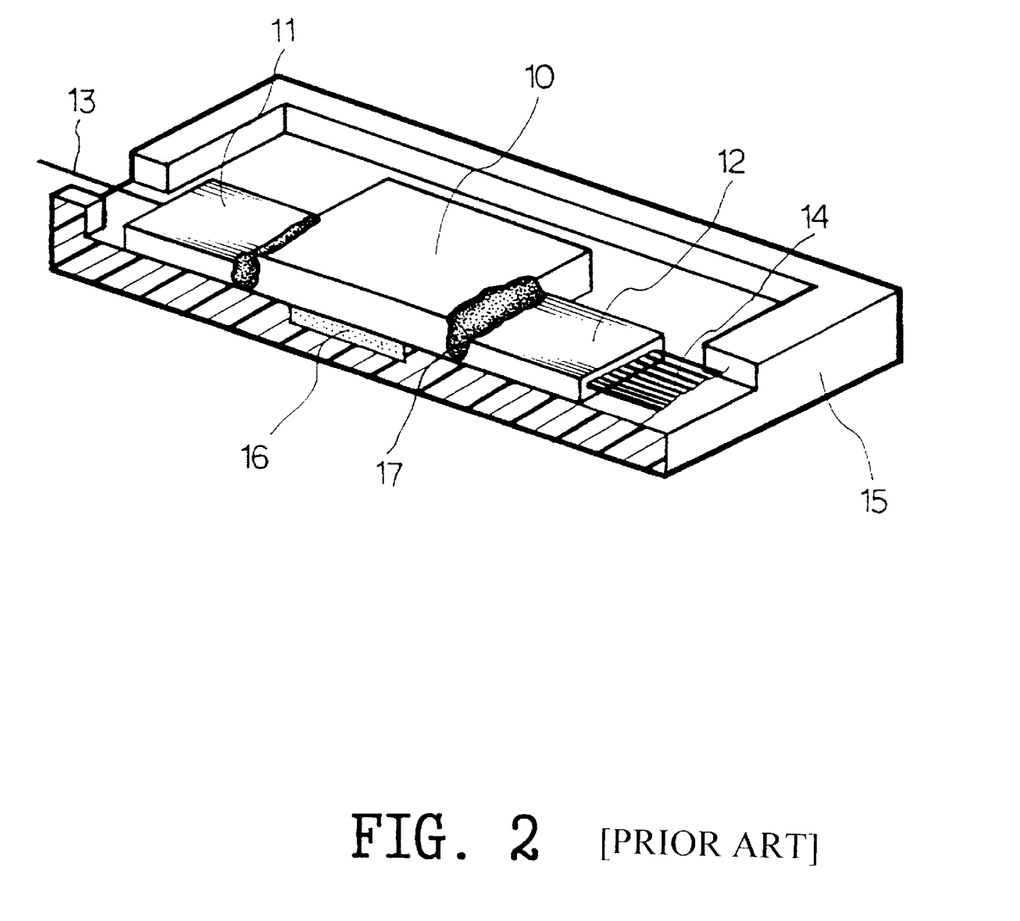
FIG. 2 is a perspective view illustrating a state where the aligned planar light waveguide circuit is packaged in a housing according to the prior art.

Now, a process for packaging the conventional planar light waveguide circuit will be described below with reference to FIGS. 1 and 2. As illustrated in these figures a conventional planar light waveguide circuit (PLC) 10 is packaged in way that the PLC 10 is in alignment with optical fiber blocks 11 and 12, which are used for receiving and outputting a light beam from or to the PLC 10. The PLC 10 is manufactured by depositing a multi-layer silica or polymer film in a silicon or quartz substrate for dividing the light strength and wavelength, changing the light path, and adjusting the light strength using a refractive index difference between the core and the cladding surrounding the core. The optical fiber blocks 11 and 12 serve to support optical fibers 13 and 14, respectively, and are manufactured by forming a V-groove on the silicon substrate.

Accordingly, the optical fiber blocks 11 and 12 arrange the optical fiber 13 and the ribbon-type optical fiber 14 in the V-groove, thus fixing them to the planar light waveguide circuit 10. Here, the PLC 10 is aligned with the optical fiber blocks 11 and 12, located at both ends thereof, through a precise position control device and then fixed (or glued) to the aligned optical fiber blocks 11 and 12 by applying the glue 17 to the contact areas. Here, an ultraviolet or thermosetting glue is typically used for the glue 17. Alternatively, the PLC 10 can be also fixed to the optical fiber blocks 11 and 12 through a welding operation instead of using the glue 17. Thereafter, the PLC 10 is packaged in a metal or plastic housing 15, and furthermore, the PLC 10 may be subject to a hermetic sealing as occasion demands. In addition, when the light waveguide circuit is required to adjust its temperature, an external power connector is connected to the housing 15 to provide a current to the light waveguide circuit. In FIG. 2, reference numeral 16 denotes a power lead.

However, in the above alignment connection process, it is important to cut the sections (or profiles) of the light waveguide circuit and the optical fiber blocks precisely to obtain optimal performance. The section cutting process includes a combination of the cutting technique using a blade and the polishing technique using abrasives. An accuracy of the section cutting process is closely related to a coupling loss, which occurs at the junction where the light waveguide circuit is coupled to the optical fiber blocks. In particular, the sloped cut section typically causes a decrease in the uniformity of an insertion loss. Therefore, a separate process for measuring the accuracy of the section cutting process is required in the prior art. If the cutting process is inaccurate, the process must be repeated and sometimes, if excessively cut, the light waveguide circuit must be discarded.

SUMMARY OF THE INVENTION

The present invention relates to a planar light waveguide circuit capable of minimizing a coupling loss, which occurs when the planar light waveguide circuit is being coupled to the optical fiber blocks, by accurately measuring the slope of a cut section of the planar light waveguide circuit and correcting the slope end of the optical fiber blocks.

According, the present invention provides a planar light waveguide circuit with landmarks used for aligning the planar waveguide circuit to the optical fiber block components.

The present invention relates to a planar light waveguide circuit, which includes a plurality of landmarks arranged along one end of the planar light waveguide circuit at intervals of a predetermined gap so as to increase the uniformity of a coupling loss occurring when connecting the planar light waveguide circuit in alignment with the optical fiber blocks.

Preferably, the landmarks are formed onto the planar light waveguide circuit so as to enable an operator to monitor a permissible angle error when cutting the side of the planar light waveguide circuit.

Preferably, Arabic numerals or specific symbols are noted in association with the landmarks indicated on the planar light waveguide circuit to assist the operator distinguish relative position of the landmarks during the cutting process.

DESCRIPTION OF THE DRAWINGS

The above and other features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail as they would obscure the invention in unnecessary detail.

Figure 3:
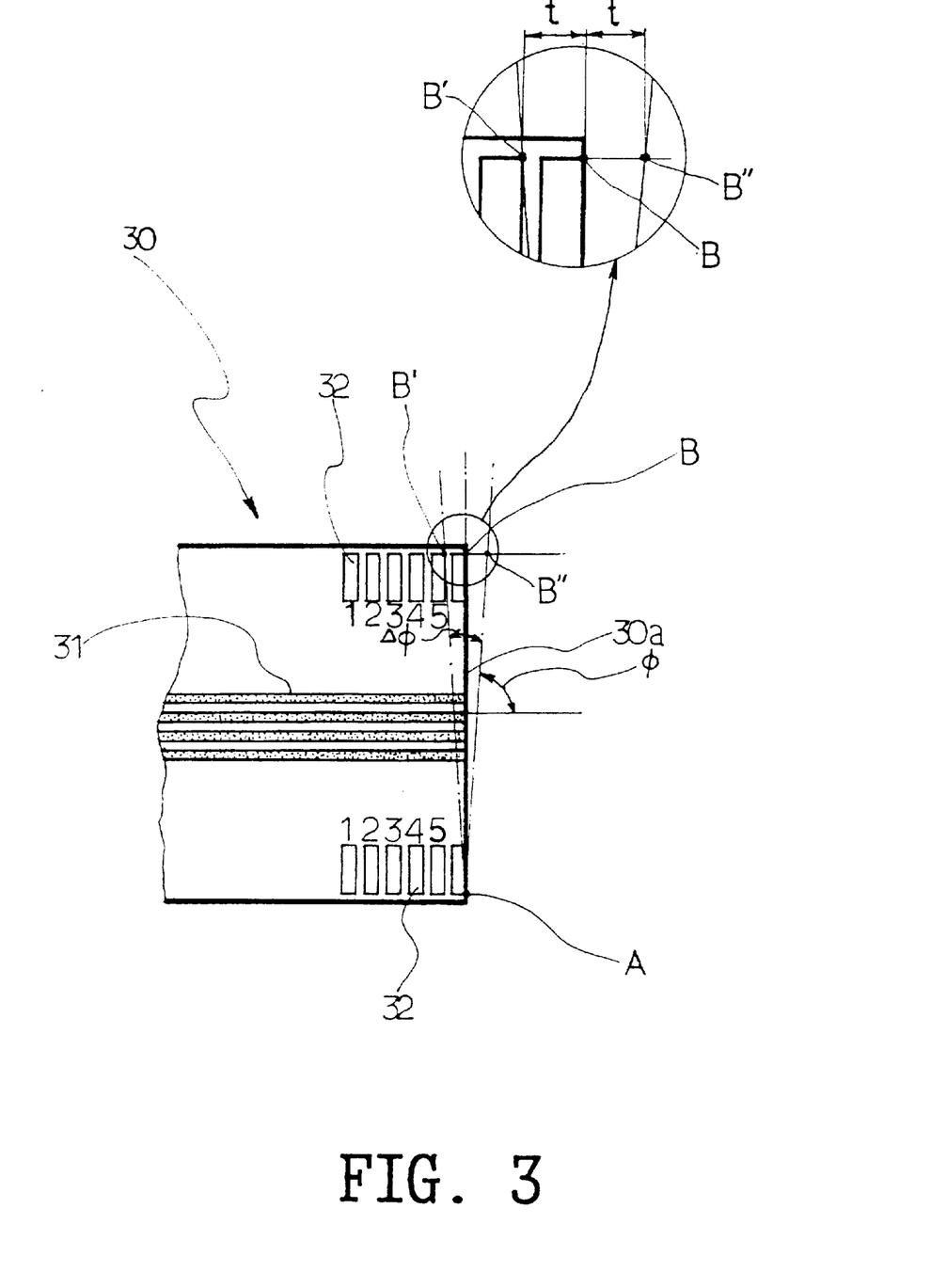
FIG. 3 is a plane view illustrating a planar light waveguide circuit with landmarks according to an embodiment of the present invention.

FIG. 3 illustrates a planar light waveguide circuit 30 with an array of landmarks 32 according to an exemplary embodiment of the present invention. As shown in FIG. 3, the landmarks 32 are provided on both ends of the planar light waveguide circuit 30 prior to cutting the section 30a, such that a segment AB should be perpendicular to a light waveguide 31. That is, the section 30a defining the boundary of the planar light waveguide circuit 30 at both ends should be cut at a right angle to the light waveguide 31.

Referring to FIG. 3, a gap "t" between two adjacent landmarks 32 is calculated in accordance with Equation (1) below:

$$t = \overline{AB}\tan\frac{\Delta\Phi}{2}. \quad (1)$$

In Equation (1), an angle $\Phi$ is variable. Therefore, it is also possible to cut section 30a at a non-right angle to the light waveguide 31. Preferably, a sufficient number of the landmarks 32 are formed starting from the cut section 30a at intervals of the gap "t", and the Arabic numerals or specific symbols are marked next to each of the landmarks 32 in order to identify the position of each landmark 32.

According to an exemplary embodiment of the present invention, the landmarks 32 are formed on the planar light waveguide circuit 30 by depositing a film on a silicon or quartz substrate, applying a photomask with a specific pattern onto the film, then etching the photomask. Therefore, the accuracy of the angle between the landmarks 32 and the light waveguide 31 depends upon the accuracy of an electron beam cutting process.

Now, a description will be made regarding the gap "t", given in Equation (1), between the adjacent landmarks 32. If $\Phi$=90, the segment AB is at a right angle (90°) with the light waveguide 31. If $\Delta\Phi$ indicates a permissible angle error, which occurs when the section 30a is being cut along a segment AB' or AB", the gap "t" between the adjacent landmarks 32 follows Equation (1).

After an array of landmarks 32 are formed on both ends of the planar light waveguide circuit 30 using the photomask, section 30a can be selectively cut and the amount of deviation relative to the landmark 32 can be monitored. In the cutting process, the operator monitors how much the landmarks 32 are removed using a microscope. Hence, the operator can selectively adjust the angle of cutting the end of the planar light waveguide circuit 30 to a desired position by observing the area of the landmarks next to section 30a. Thus, when the cut section 30a deviates, for example, from the segment AB' or AB", the operator can cut section 30a again after correcting the angle. If the cut section 30a does not deviate from the segment AB' or AB" or falls within the acceptable error angle, the operator may terminate the cutting process.

FIGS. 4A to 5B are plane views illustrating states where the planar light waveguide circuit is connected in alignment with the optical fiber blocks according to an embodiment of the present invention.

Figure 4A:
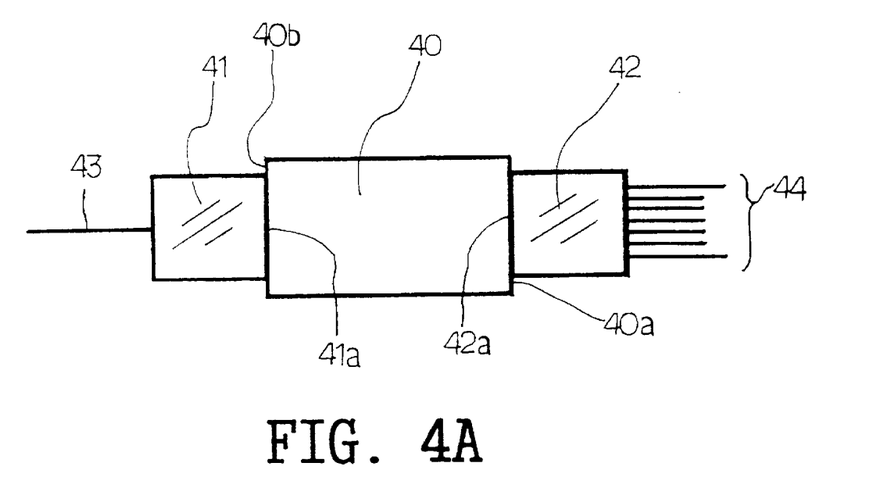
FIG. 4A is a plane view illustrating a state where optical fiber blocks are aligned with the planar light waveguide circuit with landmarks, at its both ends, according to an embodiment of the present invention.
Figure 4B:
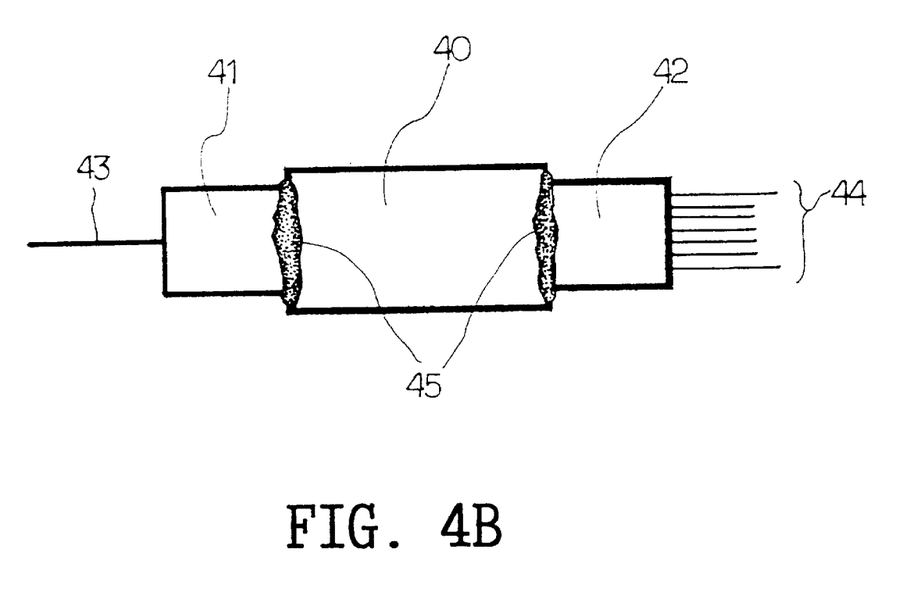
FIG. 4B is a plane view illustrating a state where the optical fiber blocks are glued to the planar light waveguide circuit with landmarks at its both ends according to an embodiment of the present invention.

Referring to FIGS. 4A and 4B, an optical fiber block 41 with a single optical fiber 43 and an optical fiber block 42 with a group of optical fibers 44 are connected in alignment with both cut sections 40a and 40b of the planar light waveguide circuit 40, respectively. The planar light waveguide circuit 40 is fixed to the optical fiber blocks 41 and 42 using an ultraviolet or thermo-setting glue 45. A silicon or quartz substrate can be used for the optical fiber blocks 41 and 42. Alternatively, it is also possible to connect the optical fiber blocks 41 and 42 to the planar light waveguide circuit 40 through a welding process instead of using the glue 45.

Figure 5A:
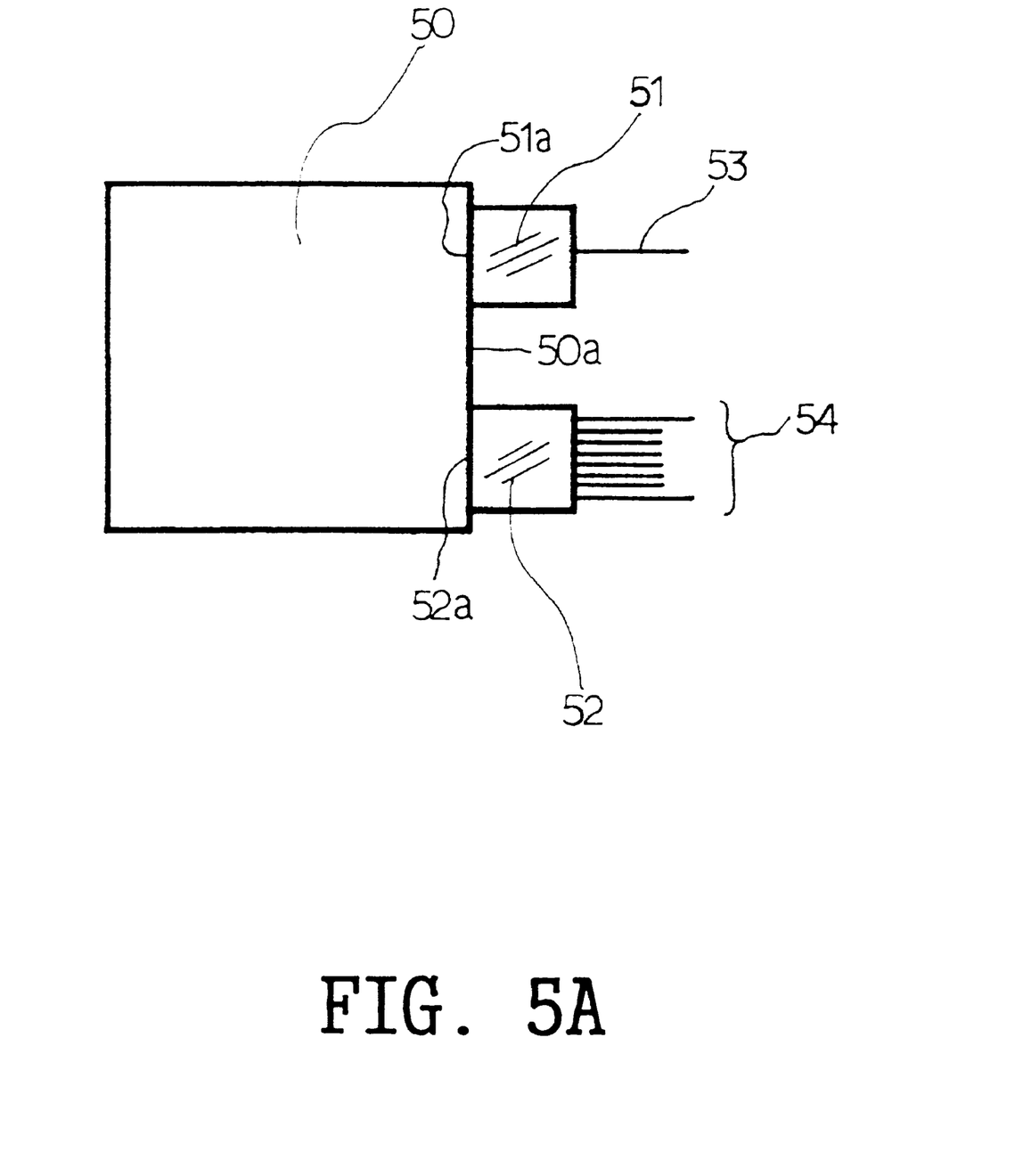
FIG. 5A is a plane view illustrating a state where optical fiber blocks are aligned with the planar light waveguide circuit with landmarks at its one end according to an embodiment of the present invention.
Figure 5B:
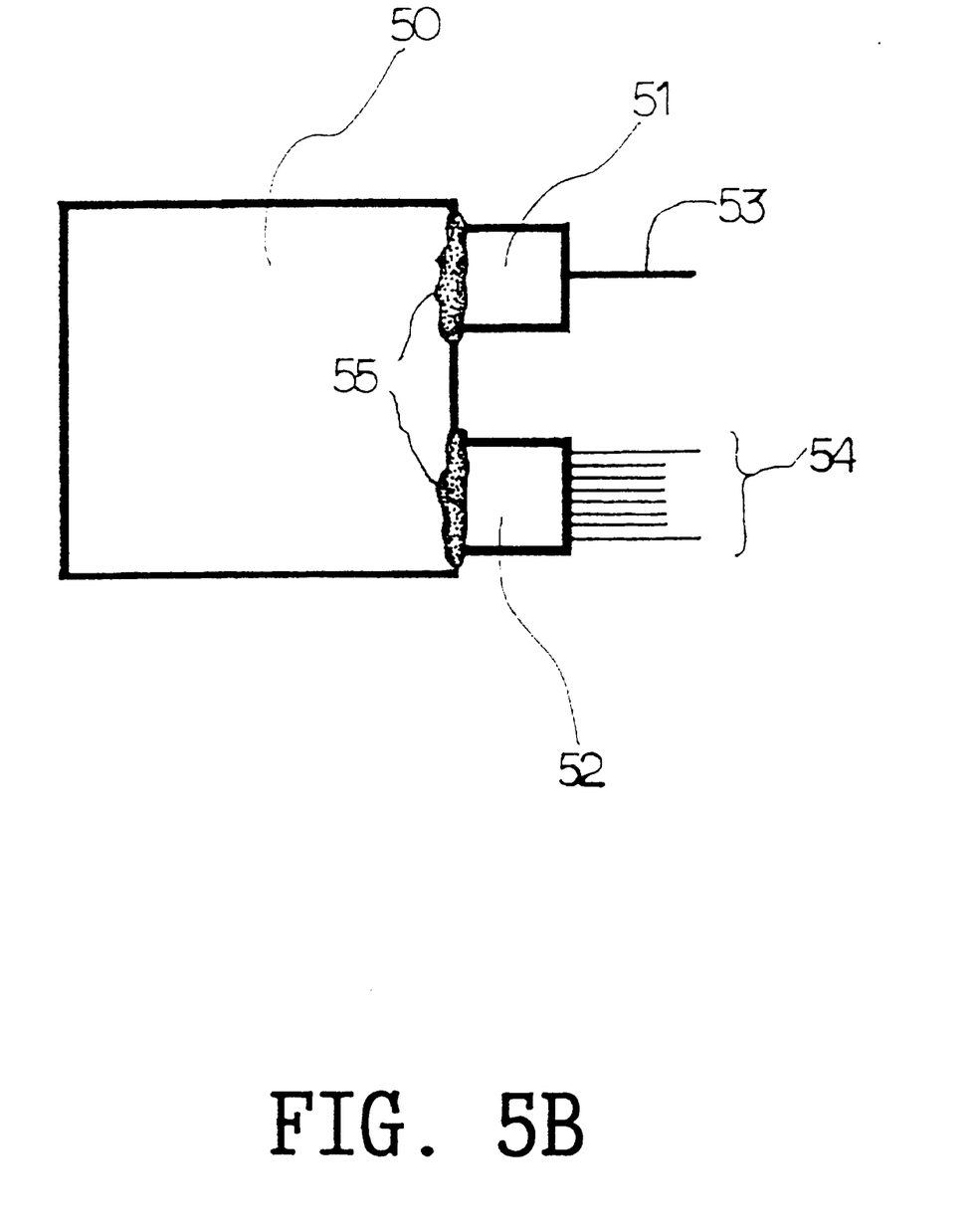
FIG. 5B is a plane view illustrating a state where the optical fiber blocks are glued to the planar light waveguide circuit with landmarks at its one end according to an embodiment of the present invention.

Referring to FIGS. 5A and 5B, an optical fiber block 51 with a single optical fiber 53 and an optical fiber block 52 with a group of optical fibers 54 are connected in alignment with a cut section 50a of a planar light waveguide circuit 50. The planar light waveguide circuit 50 is fixed to the optical fiber blocks 51 and 52 using an ultraviolet or thermo-setting glue 55. A silicon or quartz substrate can be used for the optical fiber blocks 51 and 52. Furthermore, it is also possible to connect the optical fiber blocks 51 and 52 to the planar light waveguide circuit 50 by welding instead of using the glue 55.

As explained above, the optical fiber blocks 41 and 42 can be connected in alignment with the planar light waveguide circuit 40 at its both ends as shown in FIGS. 4A and 4B. Alternatively, the optical fiber blocks 51 and 52 can be connected in alignment with the planar light waveguide circuit 50 at its one end as shown in FIGS. 5A and 5B. FIGS. 4A and 5B illustrate states where the optical fiber blocks are aligned with the planar light waveguide circuit, while FIGS. 4B and 5B illustrate states where the optical fiber blocks are fixed to the planar light waveguide circuit using the glue.

When connecting the planar light waveguide circuit in alignment with the optical fiber blocks as shown in FIGS. 4A to 5B according to an embodiment of the present invention, the operator can easily monitor the cutting state through the microscope, thereby making it possible to match the sections of the optical fiber blocks with the associated cut sections of the planar light waveguide circuit. That is, it is possible to maximize the uniformity of the coupling loss by matching a positive angle error of the planar light waveguide circuit with a positive angle error of the optical fiber blocks, and matching a negative angle error of the planar light waveguide circuit with a negative angle error of the optical fiber blocks. It should be noted that an array of landmarks may be provided on the optical block so that a desired matching angle can be precisely cut along the matching end of the optical block.

Figure 6:
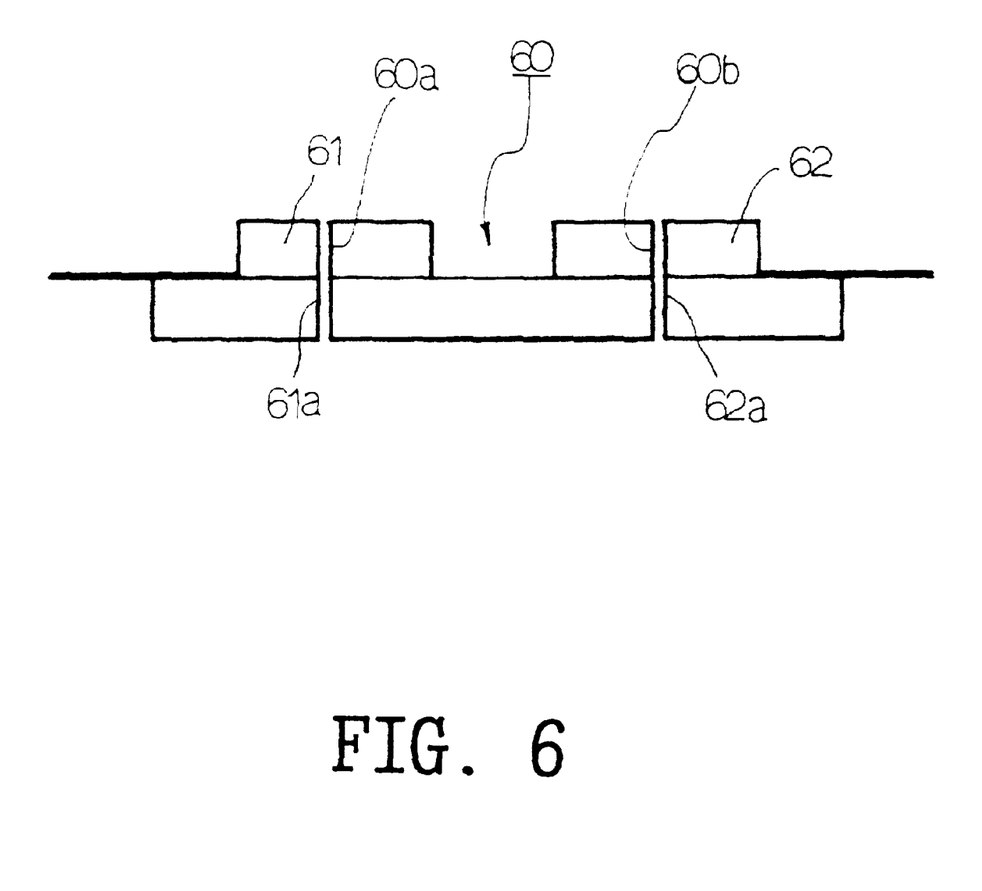
FIG. 6 is a diagram illustrating a state where both sections of the planar light waveguide circuit are at a right angle to the optical fiber blocks; and, FIG. 7 is a diagram illustrating a state where both sections of the planar light waveguide circuit are sloped at an angle of 8° or 12° with respect to the optical fiber blocks.
Figure 7:
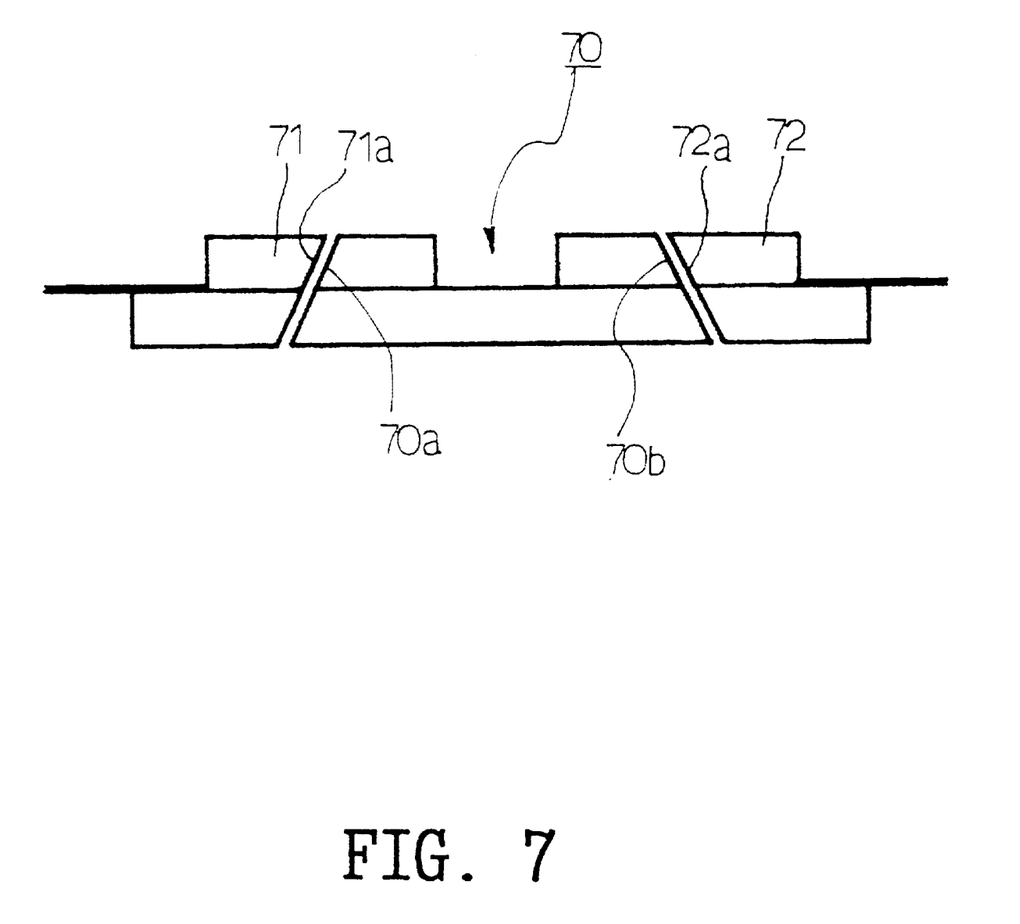

FIG. 6 illustrates a state where the cut sections 60a and 60b of the planar light waveguide circuit 60 are perpendicular to the optical fiber blocks 61 and 62, respectively, while FIG. 7 illustrates a state where the cut sections 70a and 70b of the planar light waveguide circuit 70 are sloped at an angle of 8° or 12° with respect to the optical fiber blocks 71 and 72, respectively. Referring to FIG. 6, the cut sections 60a and 60b of the planar light waveguide circuit 60 are aligned (or matched) with the cut sections 61a and 62a of the optical fiber blocks 61 and 62, respectively, on a face-to-face basis. Referring to FIG. 7, the cut sections 70a and 70b of the planar light waveguide circuit 70 are aligned with the cut sections 71a and 72a of the optical fiber blocks 71 and 72, respectively, on a face-to-face basis.

As described above, the novel planar light waveguide circuit has a plurality of landmarks formed on its surface, thus making it possible to increase the accuracy of the cutting process and the yield of the elements. In addition, it is also possible to match the cut sections of the planar light waveguide circuit with the associated cut sections of the optical fiber blocks, thereby maximally increasing the uniformity of the coupling loss.

Furthermore, it should be noted that the landmarks according to the present invention could be applied to optical elements such as an optical power divider, a wavelength divider, a switch, an attenuator, an ADM (Add Drop Multiplexing) apparatus, an OADM (Optical Add Drop Multiplexing) apparatus, and a TADM apparatus.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A light waveguide circuit comprising:
   a planar light waveguide including a core and a cladding;
   a plurality of landmarks arranged at opposite ends within the planar light waveguide, each landmark spaced apart from each other at a predetermined interval (t) starting at one end of the planar light waveguide;
   wherein the plurality of said landmarks is operative for selectively cutting one side of the planar light waveguide within a permissible angle error.

2. The planar light waveguide circuit as claimed in claim 1, wherein the predetermined interval (t) between adjacent landmarks is defined as:

$$t = \overline{AB}\tan\frac{\Delta\Phi}{2},$$

wherein $\Delta\Phi$ represents a permissible angle error and AB represents the cut section of the planar light waveguide circuit.

3. The planar light waveguide circuit as claimed in claim 1, wherein the landmarks are formed onto the planar light waveguide circuit so as to enable an operator to monitor the permissible angle error.

4. The planar light waveguide circuit as claimed in claim 1, wherein the planar light waveguide circuit includes an optical power divider, a wavelength divider, a switch, an attenuator, an ADM (Add Drop Multiplexing) apparatus, an OADM (Optical Add Drop Multiplexing) apparatus, and a TADM apparatus.

5. The planar light waveguide circuit as claimed in claim 1, wherein Arabic numerals or specific symbols are marked in association with the landmarks to distinguish the landmarks.

6. A method for aligning a planar light waveguide circuit having a plurality of waveguides to an optical block, comprising the steps of:

cutting said planar light waveguide circuit to provide a cut section that is perpendicular to the plurality of said waveguides;

providing an array of landmarks having a predetermined interval (t) starting at one end of said cut section and at the other end of said cut section, said one end of said landmarks is synchronized, in sequence, with said other end of said landmarks;

identifying a sequence order of each of said landmarks according to predetermined criteria; and, selectively cutting one side of said planar light waveguide circuit to cover the first landmark of said one end of said planar light waveguide circuit and the first landmark of said other end of said planar light waveguide circuit within a permissible angle error.

7. The method of claim 6, further comprising the step of monitoring said permissible angle error to provide the corresponding receiving end section of said optical fiber block.

8. The method of claim 6, wherein said predetermined interval (t) between adjacent landmarks is defined as:

$$t = \overline{AB}\tan\frac{\Delta\Phi}{2},$$

wherein $\Delta\Phi$ represents a permissible angle error and AB represents said cut section of said planar light waveguide circuit.

9. The method of claim 6, wherein said landmarks are formed onto said planar light waveguide circuit so as to enable an operator to monitor said permissible angle error.

10. The method of claim 6, wherein said planar light waveguide circuit includes an optical power divider, a wavelength divider, a switch, an attenuator, an ADM (Add Drop Multiplexing) apparatus, an OADM (Optical Add Drop Multiplexing) apparatus, and a TADM apparatus.

11. The method of claim 6, wherein said predetermined criteria includes Arabic numerals or specific symbols to distinguish said landmarks.

* * * * *